(12) United States Patent
Parkin et al.

(10) Patent No.: US 6,726,471 B2
(45) Date of Patent: Apr. 27, 2004

(54) FLASHBACK ARRESTOR FOR USE WITH HEAD OF OXY-FUEL TORCH

(75) Inventors: Nigel Parkin, Florence, SC (US); John Onorato, Florence, SC (US); Paul Mercuri, Florence, SC (US)

(73) Assignee: The Esab Group, Inc., Florence, SC (US)

( * ) Notice: Subject to any disclaimer, the term of this patent is extended or adjusted under 35 U.S.C. 154(b) by 192 days.

(21) Appl. No.: 09/939,850

(22) Filed: Aug. 27, 2001

(65) Prior Publication Data

US 2003/0096207 A1 May 22, 2003

(51) Int. Cl.[7] ............................................... F23D 14/82
(52) U.S. Cl. ....................................... 431/346; 431/347
(58) Field of Search ................................. 431/346, 347, 431/328, 170

(56) References Cited

U.S. PATENT DOCUMENTS

| | | |
|---|---|---|
| 1,097,263 A | 5/1914 | Reich |
| 1,114,706 A | 10/1914 | Brousseau |
| 1,139,959 A | 5/1915 | Fausek et al. |
| 1,176,017 A | 3/1916 | Armstrong |
| 1,228,038 A | 5/1917 | Marlin |
| 1,290,422 A | 1/1919 | Vale et al. |
| 1,439,861 A | 12/1922 | Brown et al. |
| 1,729,206 A | 9/1929 | Coberly |
| 1,955,120 A | 4/1934 | Fausek et al. |
| 2,391,592 A | 12/1945 | Pierson |
| 2,482,457 A | 9/1949 | Boedecker |
| 2,810,631 A | 10/1957 | Kanenbley |
| 2,974,723 A | * 3/1961 | Blanchard .................. 431/240 |
| 3,182,334 A | * 5/1965 | Hammon .................... 251/121 |
| 3,192,987 A | * 7/1965 | Hammon .................... 431/207 |
| 3,243,272 A | 3/1966 | Schmitz |
| 3,746,500 A | 7/1973 | Hughey |
| 3,866,839 A | 2/1975 | Magner |
| 3,933,444 A | 1/1976 | Kilgore |
| 4,022,441 A | 5/1977 | Turney |
| 4,184,931 A | 1/1980 | Inoue |
| 4,248,384 A | 2/1981 | Zwicker |
| 4,251,226 A | 2/1981 | Nishikawa |
| 4,286,620 A | 9/1981 | Turney |
| 4,361,420 A | 11/1982 | Bell |
| 4,409,002 A | 10/1983 | Zwicker |
| 4,431,167 A | 2/1984 | Clarke |
| 4,548,358 A | 10/1985 | Fischer |
| 4,566,676 A | 1/1986 | Lotz |
| 4,585,409 A | 4/1986 | Pryor |
| 4,664,621 A | 5/1987 | Sugisaku et al. |
| 4,732,559 A | 3/1988 | Pearl, II et al. |
| 4,846,670 A | 7/1989 | Pearl, II et al. |
| 4,923,394 A | 5/1990 | Fumino |
| 5,392,825 A | 2/1995 | Mims et al. |
| 5,407,348 A | 4/1995 | Mims et al. |
| 5,470,227 A | 11/1995 | Mims et al. |
| 5,560,546 A | 10/1996 | Goulet et al. |
| 5,688,469 A | 11/1997 | Edenfield |
| 5,769,119 A | 6/1998 | Edenfield |
| 5,792,281 A | 8/1998 | Diehl |
| 5,799,878 A | 9/1998 | Görde et al. |

FOREIGN PATENT DOCUMENTS

| | | |
|---|---|---|
| DE | 25 12 947 A1 | 10/1976 |
| GB | 2 181 530 A | 4/1987 |
| WO | WO 94 16270 A1 | 7/1994 |
| WO | WO 95 01533 A1 | 1/1995 |

* cited by examiner

*Primary Examiner*—Alfred Basichas
(74) *Attorney, Agent, or Firm*—Alston & Bird LLP

(57) ABSTRACT

Flashback protection is provided in or proximate the head of a cutting torch by a fitting, which can be in the form of an adapter or a cutting tip for mounting to the head. The fitting includes a body and porous structure that is preferably carried by the body and is a distinct component from the body. The porous structure has a multiplicity of convolute passageways extending therethrough for restricting flashback.

49 Claims, 9 Drawing Sheets

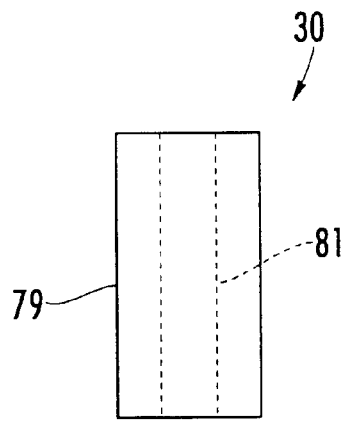
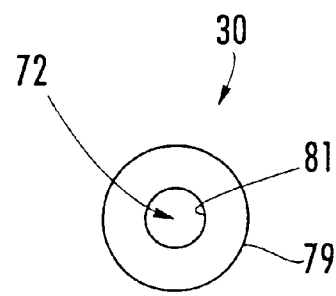
FIG. 9.
FIG. 10.
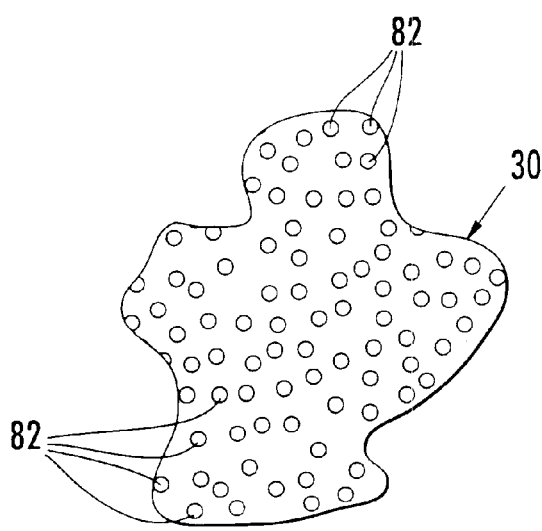
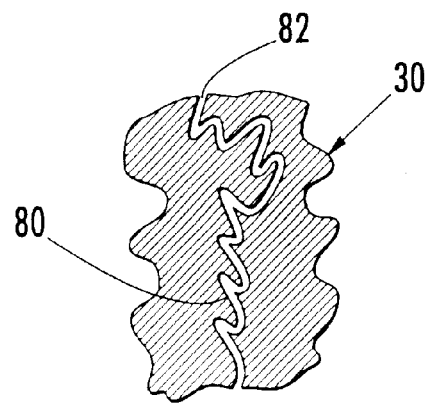
FIG. 11.
FIG. 12.

FLASHBACK ARRESTOR FOR USE WITH HEAD OF OXY-FUEL TORCH

FIELD OF THE INVENTION

The present invention relates to cutting torches and, more particularly, to cutting torches with flashback arrestors.

BACKGROUND OF THE INVENTION

Oxy-fuel cutting torches discharge fuel gas and oxygen from a nozzle for cutting purposes. A typical torch includes a control body for being connected to separate fuel gas and oxygen supplies, tubes for supplying the oxygen and fuel gas from the control body to a head, and a cutting tip mounted to the head. The cutting tip receives the fuel gas and oxygen from the head and discharges these gases from its nozzle. More specifically, the head includes an interior surface extending around and defining a head cavity, an oxygen port that is open to the head cavity for supplying oxygen to the head cavity, and a fuel gas port that is open to the head cavity for supplying fuel gas to the head cavity. The cutting tip includes multiple passageways for directing the gases from the head to the nozzle.

Conventional torches first generate a preheat flame with gases discharged from the nozzle, and the preheat flame is used to heat a metal workpiece. After the preheat flame has heated the workpiece sufficiently, a high velocity cutting oxygen stream is activated and delivered through the nozzle. The high velocity cutting oxygen stream physically removes molten material of the workpiece by oxidation, to cut the workpiece. Typically, a number of valves and related components are provided upstream of the nozzle, such as in the control body, to control the operations of the cutting torch.

Flashback is a reaction caused in cutting torches by the reverse flow and ignition of the explosive mixture of gases used in the operation of the torch. Flashback typically originates at the nozzle of the torch and is often caused by an obstruction at this point, operator error, improper gas pressure and/or defective equipment. Due to the rapid and explosive nature of flashback, it poses a major safety hazard to the operator of the gas torch and can damage the gas torch and associated equipment. Accordingly, and as disclosed in U.S. Pat. Nos. 5,407,348 and 5,470,227, it is common for flashback arrestors constructed of sintered material to be used at the entry point of the gases into the torch. Whereas this stops the flashback from traveling upstream from the torch into the gas hoses, regulators and cylinders that supply the gas to the torch, it disadvantageously does not eliminate the effects of flashback within the torch itself, which means that the torch can be damaged or the operator can be injured by flashback within the torch.

It is also known to install packing material into the head of a torch or in a tube that is immediately upstream from the head for arresting flashback, as respectively disclosed in U.S. Pat. Nos. 1,176,017 and 1,290,422. It is common for this packing material to become damaged, such as by becoming clogged with carbon deposits resulting from flashback. As a result, the packing material must be periodically replaced. Disadvantageously, the removal and replacement of packing material in cutting torches is labor intensive. Additionally, and of significant safety importance, if the packing material is not properly packed it may not perform its intended function, which can result in damage to the torch or injury to its operator.

It is also known for the few gas-carrying passageways that are machined into cutting tips and cutting tip adapters to be shaped so that they have abrupt directional changes which are intended to restrict flashback, as is disclosed in U.S. Pat. Nos. 1,439,861; 3,746,500; 4,431,167 and 5,688,469. However, because there are constraints on the size of some cutting tips, it is common for the number of directional changes that can be efficiently provided by machining passages to be very limited. This limitation can in at least some situations disadvantageously limit the effectiveness of these types of adapters and cutting tips with respect to restricting flashback.

Accordingly, there is a need in the art for a flashback arrestor proximate the head of a cutting torch for restricting flashback into head, and which can be readily used and replaced in a manner that is likely to ensure satisfactory functionality of the flashback arrestor.

SUMMARY OF THE INVENTION

In accordance with one aspect of the present invention, flashback protection is provided proximate the head of a cutting torch by a fitting, which is preferably in the form of an adapter or a cutting tip for mounting to the head. In accordance with this aspect, the fitting includes a body and porous structure that is carried by the body and is a distinct component from the body. The porous structure has a multiplicity of convolute passageways extending therethrough for restricting flashback, preferably by safely extinguishing any flashback proximate its source. Further in accordance with this aspect, the fitting can be readily used and replaced in a manner that is likely to ensure optimum functionality. Preferably for each fitting the porous structure is carried by the body in a manner that promotes the disposal of the used fitting rather than just the replacement of the porous structure of the fitting, which promotes safe operation of cutting torches by inhibiting end users from improperly installing the porous structure. Alternatively, the porous structure can be readily removable from the fitting and is replaceable.

In accordance with one aspect of one embodiment of the present invention, an end of the body of the fitting is inserted into the cavity of a head when mounting the fitting to the head, the end of the body is withdrawn from the cavity when unmounting the fitting from the head, the body defines at least one oxygen passageway that is in communication with the oxygen port of the head for receiving oxygen while the body is mounted to the head, the fitting defines at least one and preferably a plurality of fuel gas passageways that are in communication with the fuel port of the head for receiving fuel gas while the body is mounted to the head, and the porous structure is associated with the body so that the porous structure restricts flashback from entering the fuel port of the head while the body is mounted to the head. In addition, the porous structure is carried by the body so that it moves with the body when the body is moved from being completely separate from the head to being mounted to the head, and when the body is being moved from being mounted to the head to being completely separate from the head. As a result, the fitting can be easily initially installed and replaced with minimal risk of the porous structure being incorrectly installed and thereby failing to perform its intended function. Preferably the porous structure is positioned in the fuel passageways to restrict flashback through the fuel passageways.

In accordance with another aspect, a first part of the body is mounted to a second part of the body so that surfaces of these parts together define a chamber that contains the porous structure. This advantageously seeks to render the fitting tamper resistant and thereby enhance the disposable aspect of the fitting. That is, and in addition to the fitting being constructed so as to minimize the risk of the porous structure being incorrectly installed, in accordance with the present aspect a user will preferably be unaware of the possibility of disassembling the fitting to replace the porous structure should it become clogged, which will advantageously minimize the possibility of a user incorrectly installing a replacement porous structure within the fitting. Alternatively, the porous structure can be readily removable from the fitting and is replaceable.

In accordance with another aspect, the outer part of the body includes upstream fuel passageways, and the inner part of the body includes downstream fuel passageways. Further in accordance with this aspect, the inner part of the body includes a bore, the outer part of the body includes the oxygen passageway, and the oxygen passageway extends through the bore. Preferably the fuel gas passageways are positioned around and radially distant from the oxygen passageway.

In accordance with another aspect, the fitting is a cutting tip. In contrast and in accordance with another aspect of the present invention, the fitting is an adapter for having a cutting tip mounted thereto. In accordance with this aspect, there are multiple annular chambers that extend around and are isolated from the oxygen passageway, and that are open to the fuel gas passageways.

In accordance with one aspect of another embodiment of the present invention, the fitting is mounted to the head by engaging threads of the body to threads of head and rotating the body relative to the head through a plurality of revolutions in a first direction. Accordingly, the body can be unmounted from the head by causing relative rotation between the head and the body through a plurality of revolutions in a second direction which is opposite from the first direction. The porous structure is fitted to the body to restrict flashback from entering the fuel port of the head. As a result, the fitting can be easily initially installed and replaced with minimal risk of the porous structure being incorrectly installed and thereby failing to perform its intended function, since the porous structure is fitted to the body for installation and removal therewith. Alternatively, the fitting can be mounted to the head by means other than threads.

In accordance with another aspect, the fitting is an adapter and a cutting tip is mounted to the head via the adapter. Preferably the porous structure is annular and thereby defines a bore through which the cutting tip extends.

In accordance with another aspect, the fitting includes a port having an axis that extends radially with respect to the axis of the body. Preferably the body includes a channel that is adjacent and at least partially encircles the porous structure and is for passing fuel between the port and convolute passageways of the porous structure.

In accordance with another aspect, the porous structure is press-fit to the body, and in accordance with this same or another aspect, the porous structure is secured to the body by at least one fastening device, such as a pin-like shaft, that penetrates the porous structure and the body. This advantageously seeks to render the fitting tamper resistant and disposable. That is, the porous structure is preferably securely mounted to the body such that it will be difficult or at least inconvenient for a user to disassemble the fitting to replace the porous structure should it become clogged, which will advantageously minimize the possibility of a user incorrectly installing a replacement porous structure in the fitting. Alternatively, the porous structure can be readily removable from the fitting and is replaceable.

It is accordingly an aspect of the present invention to promote safe use of a cutting torch by suppressing flashback proximate its source through the use of a fitting that is substantially fool-proof, such as, for example, by being disposable.

BRIEF DESCRIPTION OF THE DRAWINGS

Figure 1:
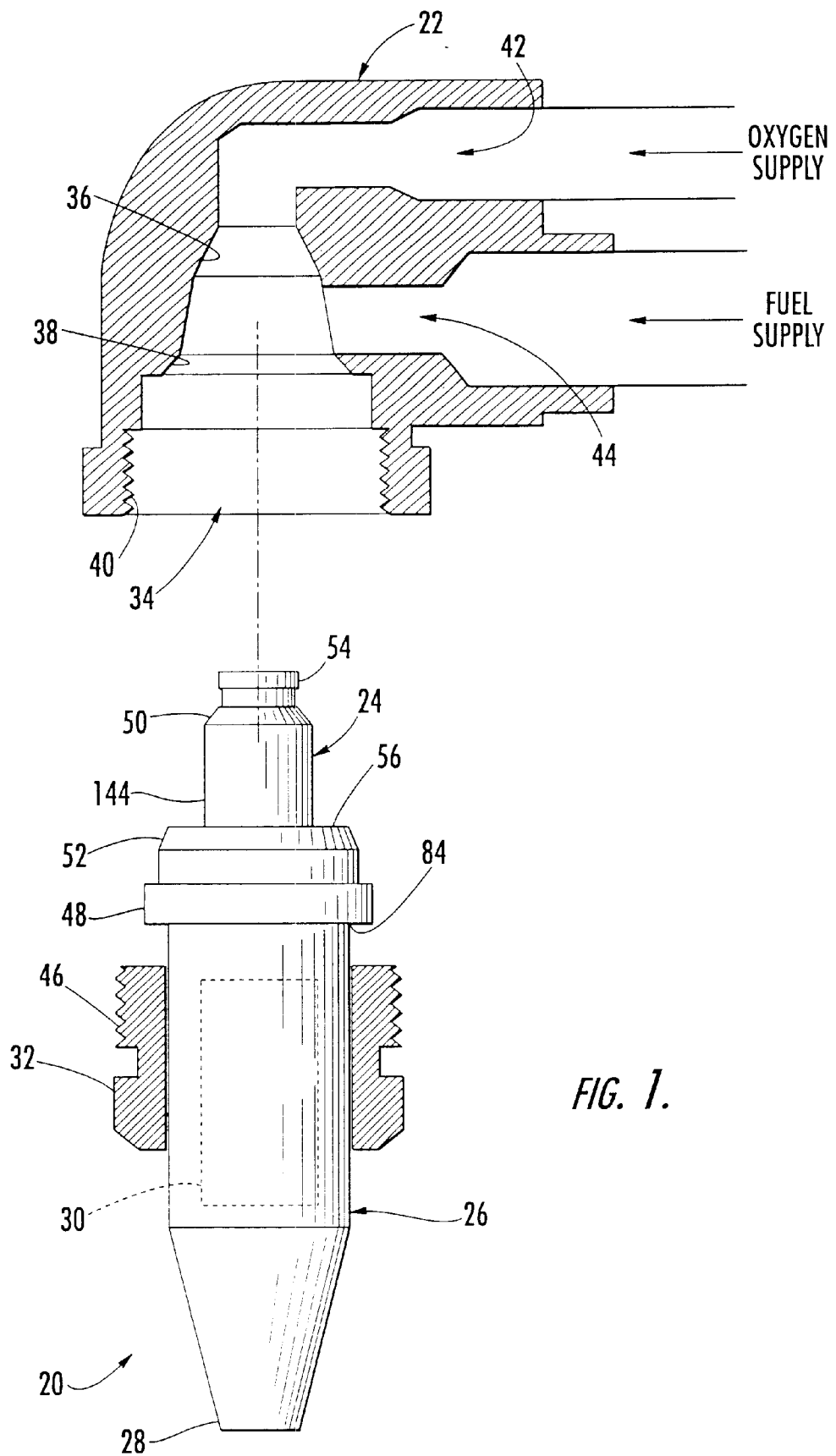
Figure 2:
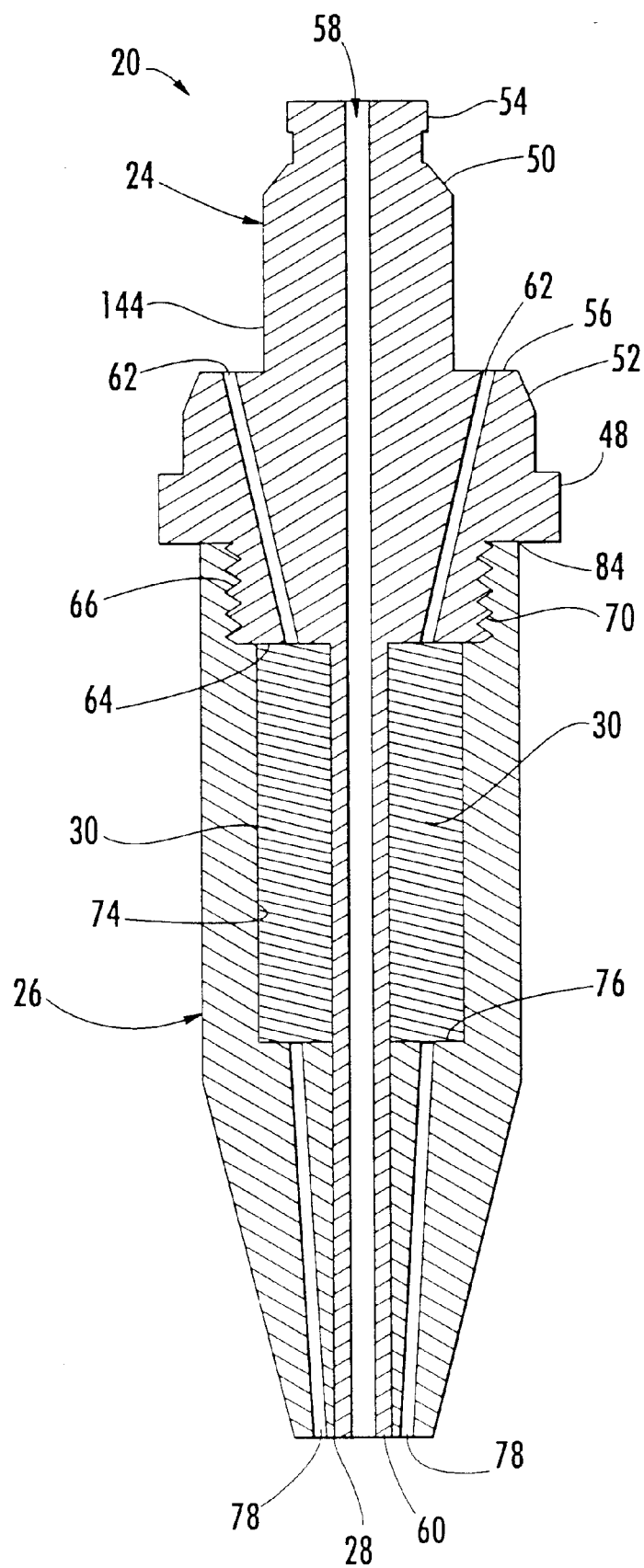
Figure 3:
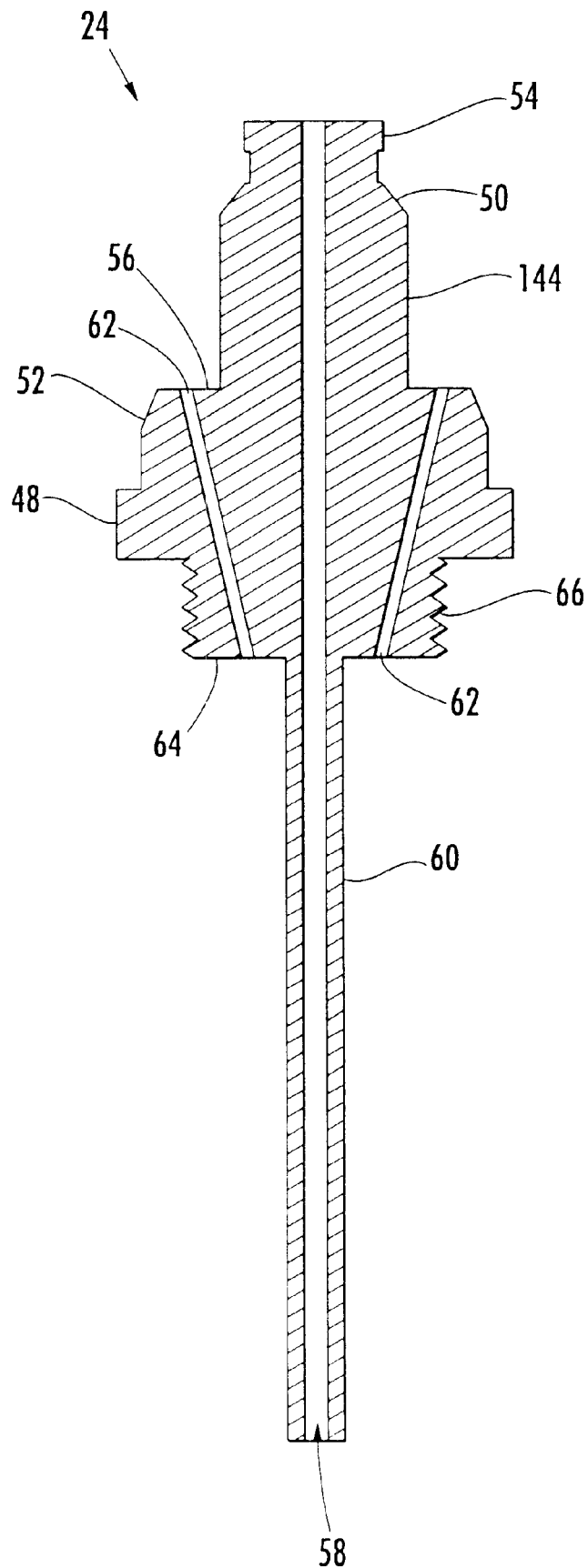
Figure 4:
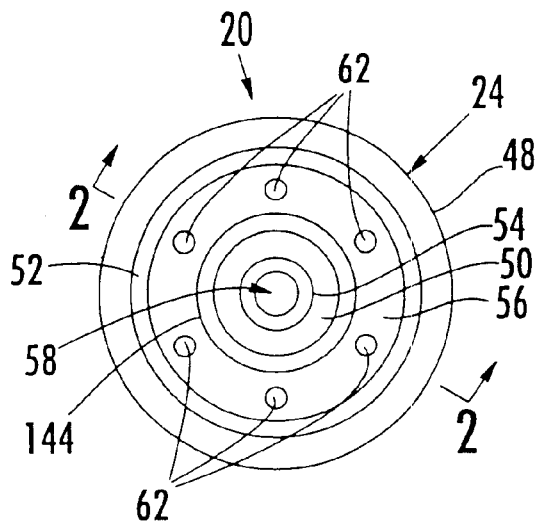
Figure 5:
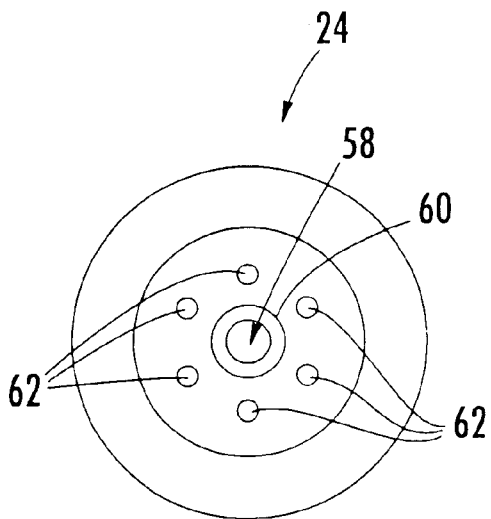
Figure 7:
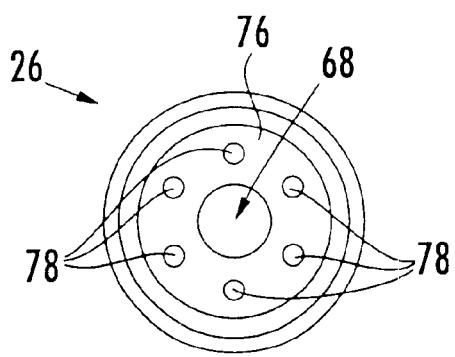
Figure 8:
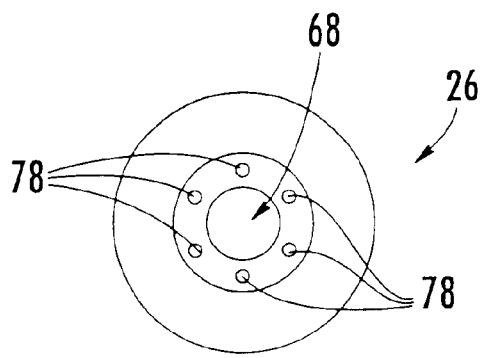
Figure 6:
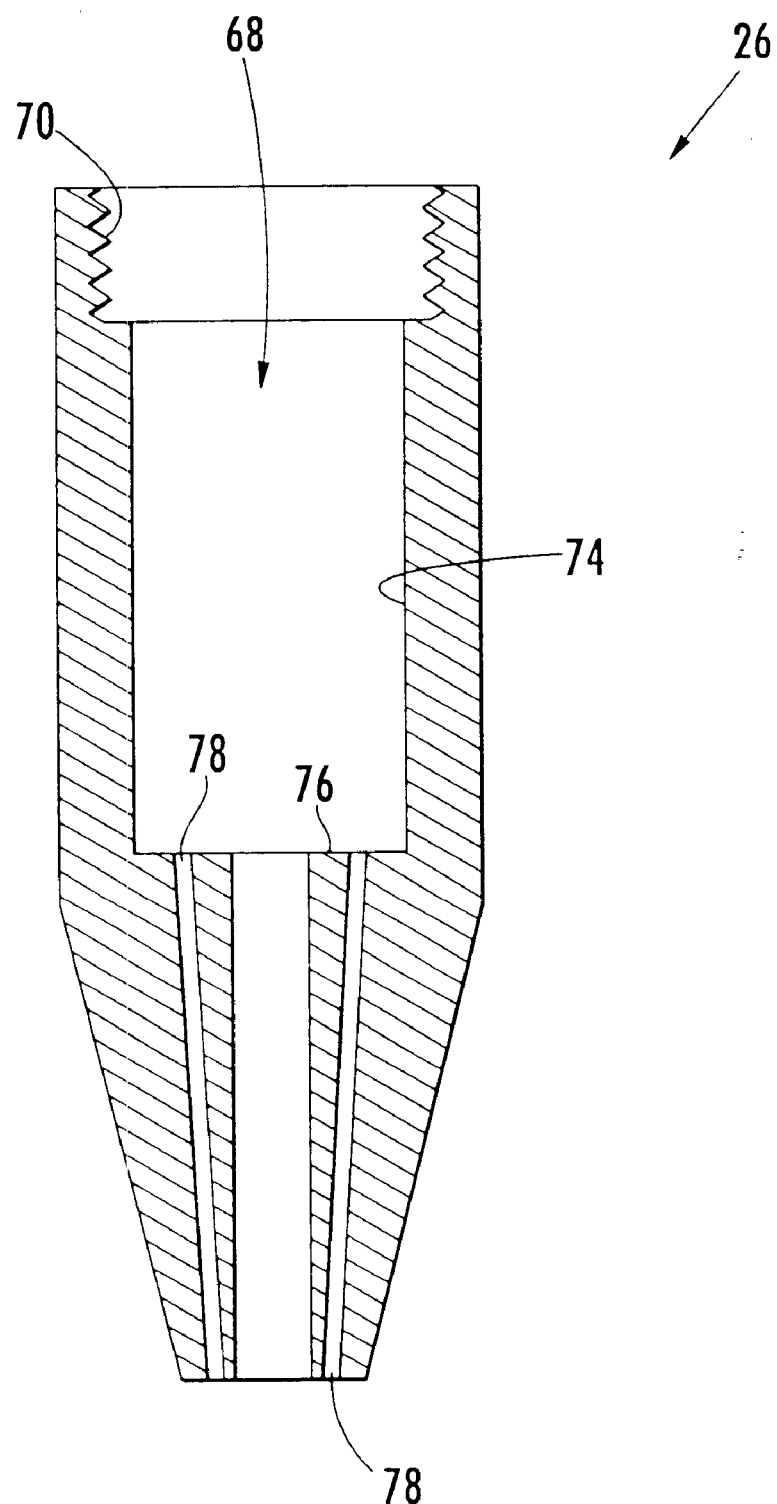
Figure 13:
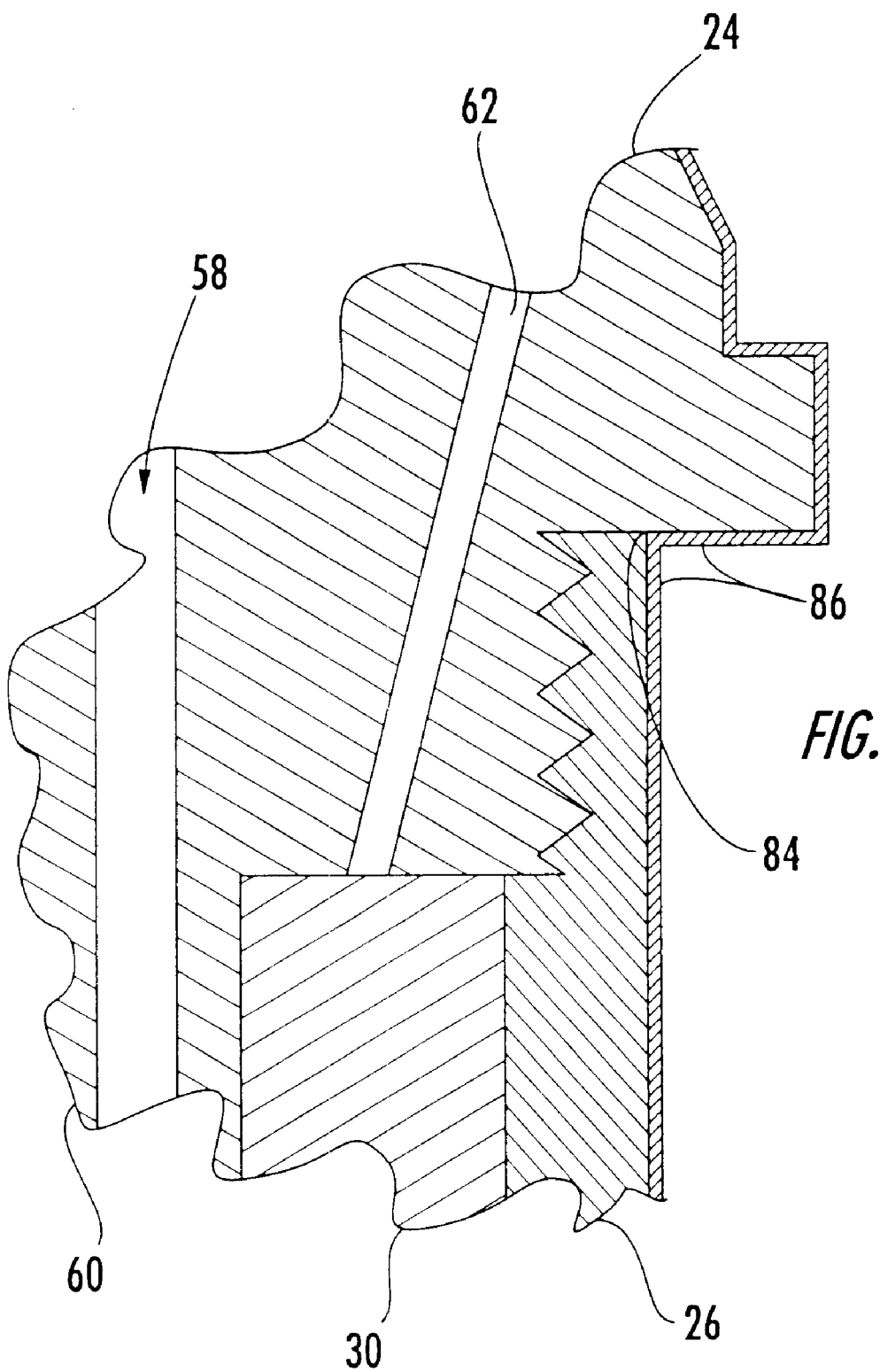
Figure 14:
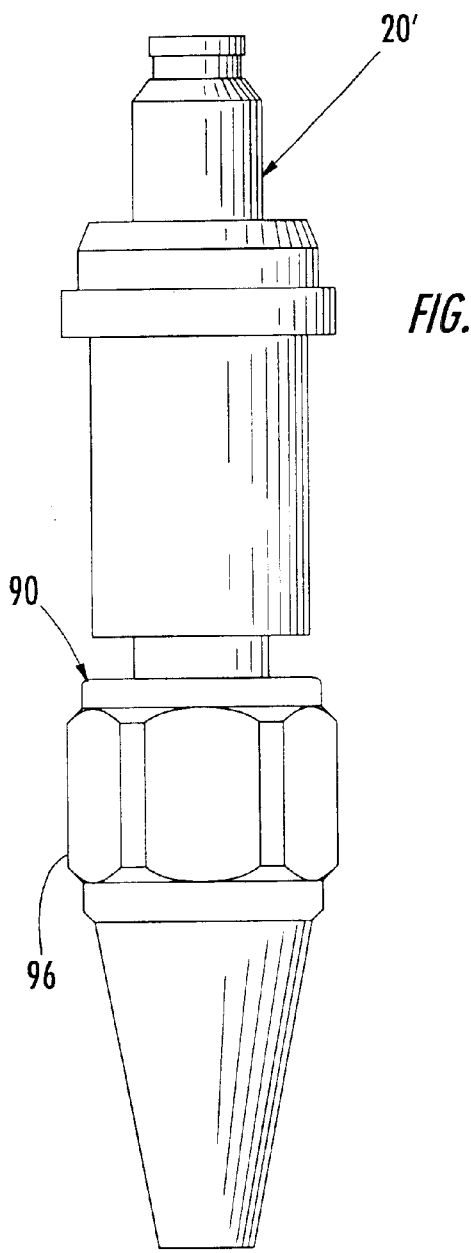
Figure 15:
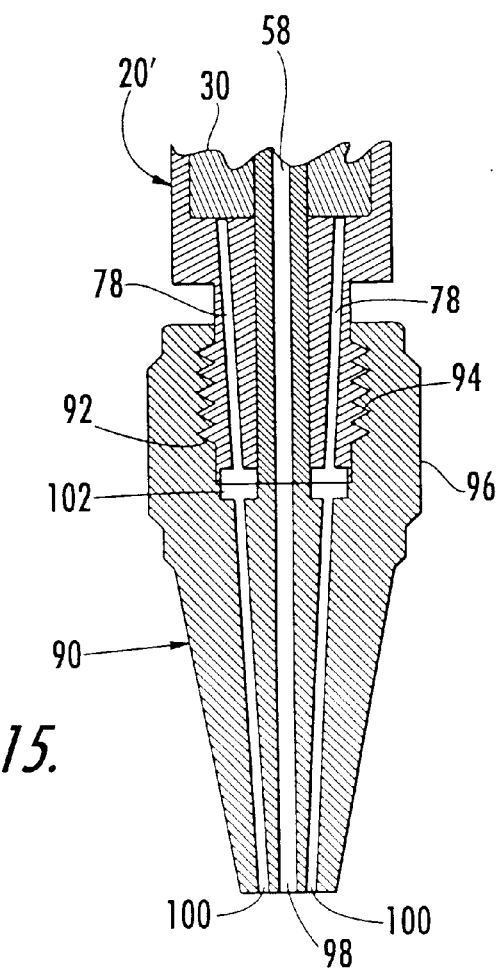
Figure 16:
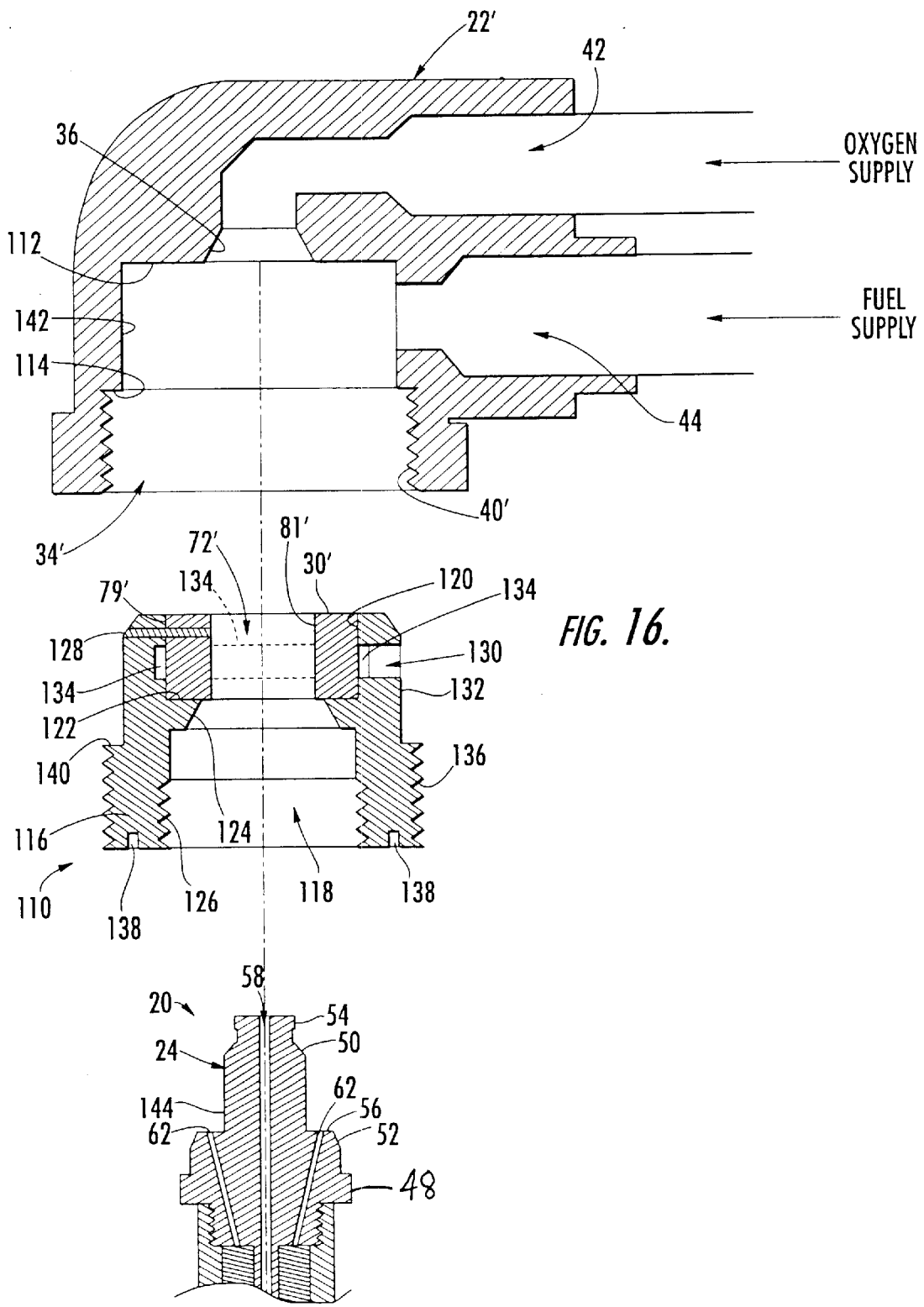

Having thus described the invention in general terms, reference will now be made to the accompanying drawings, which are not necessarily drawn to scale and the majority of which are at least partially schematic, and wherein:

FIG. 1 is an exploded view of a cutting tip of the present invention and a head of a conventional cutting torch, wherein a nut encircling the cutting tip and the head are cross-sectioned along their axes, and a porous structure that is internal to the cutting tip is shown in broken lines, in accordance with one embodiment of the present invention;

FIG. 2 is a cross-sectional view of the cutting tip taken along line 2—2 of FIG. 4;

FIG. 3 is an isolated, cross-sectional view of an inner part of the cutting tip taken along line 2—2 of FIG. 4;

FIG. 4 is a top plan view of the cutting tip, which is identical to a top plan view of the inner part;

FIG. 5 is a bottom plan view of the inner part;

FIG. 6 is an isolated, cross-sectional view of an outer part of the cutting tip taken along line 2—2 of FIG. 4;

FIG. 7 is a top plan view of the outer part;

FIG. 8 is a bottom plan view of the outer part;

FIG. 9 is a side elevational view of the porous structure;

FIG. 10 is a plan view of the porous structure;

FIG. 11 is an enlarged, partial view illustrating pores of the porous structure;

FIG. 12 is an enlarged, cross-sectional view illustrating a representative convolute path formed by the pores of the porous structure;

FIG. 13 is a partial, cross-sectional view of a cutting tip that has been cross-sectioned in the same manner that is indicated by lines 2—2 of FIG. 4, in accordance with another embodiment of the present invention;

FIG. 14 is an elevational view of a combination of an adapter and cutting tip, in accordance with another embodiment of the present invention;

FIG. 15 is a partial view of the combination of FIG. 14 cross-sectioned in the same manner that is indicated by lines 2—2 of FIG. 4; and FIG. 16 is an exploded view of an adapter and a head of a cutting torch, and a portion of a cutting tip, with each cross-sectioned along its axis, in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a fitting in the form of a cutting tip 20 is shown exploded away from a head 22 of a conventional oxy-fuel cutting torch, in accordance with a first embodiment of the present invention. Briefly described, the cutting tip 20 includes coaxial inner and outer parts 24, 26 that are mounted to one another and together provide a nozzle 28 that is located at a lower end of the cutting tip for discharging oxygen and fuel gas. In accordance with an alternative embodiment of the present invention, rather than including both the inner and outer parts 24 and 26, these two parts are combined into a single piece. An internal porous structure 30 is within the cutting tip 20 for restricting flashback through the cutting tip. The porous structure 30 is hidden from view in FIG. 1 and is therefore illustrated by broken lines. The cutting tip 20 is removably mounted to the head 22 in a conventional manner by an externally threaded nut 32, as will be discussed in greater detail below.

The head 22 includes an interior surface that extends around an axis to define a composite cavity 34 that is open at the lower end of the head. The interior surface of the head 22 includes annular upper and lower seating surfaces (i.e., upper and lower seats 36, 38) that are coaxial with the composite cavity 34 and define an oblique angle with respect to the axis of the composite cavity. The interior surface of the head 22 further defines interior threads 40 that are coaxial with the composite cavity 34. The head further includes an oxygen port 42 that is open to the composite cavity 34 and is for receiving gaseous oxygen from an oxygen supply. Likewise, the head includes a fuel port 44 that is open to the composite cavity 34 and is for receiving fuel gas from a fuel supply. In accordance with the first embodiment of the present invention, the fuel gas includes a "premixed" mixture of oxygen and a gaseous fuel, such as acetylene, or the like. However, the present invention is also applicable to "post-mixed" cutting torches, as will be discussed in greater detail below.

The "oxygen supply" and "fuel supply" illustrated in FIG. 1 are representative of conventional gas supplies and conventional cutting torch components that are upstream from the head 22. In one specific example, the "oxygen supply" and "fuel supply" illustrated in FIG. 1 are representative of a control body connected to separate fuel gas and oxygen supplies, and tubes for supplying the oxygen and fuel gas from the control body to the head, with the control body including valves and related components for controlling the operations of the torch.

The cutting tip 20 is mounted to the head 22 by inserting the upper end of the cutting tip into the composite cavity 34 and then engaging exterior threads 46 of the nut 32 to the interior threads 40 of the head. The nut 32 is rotated so that an annular upper edge of the nut engages a lower surface of a lower flange 48 of the cutting tip 20, to force the cutting tip into the composite cavity 34. Movement of the cutting tip 20 into the composite cavity 34 ceases when the cutting tip is coaxial with the composite cavity and fully engages the seats 36, 38 of the head 22. More specifically, the cutting tip 20 includes annular upper and lower seating surfaces (i.e., upper and lower seats 50, 52) that extend coaxially around the axis of the cutting tip and at an oblique angle thereto, and the seats 50, 52 of the cutting tip respectively coaxially and securely engage the seats 36, 38 of the head 22 while the cutting tip is mounted to the head.

In accordance with the first embodiment of the present invention, an oxygen chamber is formed within the upper region of the composite cavity 34 while the upper seats 36, 50 are securely engaged to one another. The oxygen chamber is open to the oxygen port 42 and closed to the fuel port 44, and an upper flange 54 of the cutting tip 20 is positioned within the oxygen chamber. At the same time, the lower seats 38, 52 are securely engaged to one another so that a fuel chamber is formed within the composite cavity 34 in the axial space between the upper seats 36, 50 and the lower seats 38, 52. The fuel chamber is open to the fuel port 44 and closed to the oxygen port 42, and an upper shoulder 56 of the cutting tip 20 is positioned within the fuel chamber.

Referring to the inner part 24 shown in FIGS. 2–5, an oxygen passageway 58 extends coaxially through the inner part. The oxygen passageway 58 has an inlet at the upper end of the inner part 24, extends through a stem 60, and includes an outlet at the lower end of the inner part. Multiple upstream fuel passageways 62 extend through the inner part 24 and are positioned around and radially distant from the axis of the inner part. Each upstream fuel passageway includes an inlet at the upper shoulder 56 and an outlet at an annular and coaxial lower shoulder 64 of the inner part 24. Coaxial external threads 66 of the inner part 24 are for mounting the inner part to the outer part 26.

Referring to the outer part 26 shown in FIGS. 2 and 6–8, it includes an interior surface that extends coaxially around the elongate axis of the interior part to define a central bore 68 that is open at the upper and lower ends of the outer part. The interior surface of the outer part 26 includes coaxial interior threads 70 that engage the exterior threads 66 of the inner part 24 when the stem 60 of the inner part is inserted through the porous structure 30 and into the central bore 68. Then, the inner and outer parts 24, 26 are coaxially rotated relative to one another so that via the threads 66, 70 the inner part is fully screwed into the central bore 68, as illustrated in FIG. 2. That is, the cutting tip 20 can be assembled by inserting the stem 60 through a coaxial bore 72 (FIG. 10) defined through the porous structure 30, thereafter inserting the stem through the central bore 68 of the outer part 26, and then relatively rotating the inner and outer parts 24, 26 so that the threads 66, 70 mesh and the upper end of the outer part thereafter engages the underside of the lower flange 48 of the inner part.

The interior surface of the outer part 26 also includes a coaxial, cylindrical interior surface 74 and a coaxial, annular interior shoulder 76 which together with the exterior surface of the stem 60 and the lower shoulder 64 of the inner part 24 define a coaxial annular chamber that contains the porous structure 30, and is preferably substantially fully occupied by the porous structure. While the cutting tip 20 is filly assembled as illustrated in FIG. 2, the annular chamber that contains the porous structure 30 is completely closed, except for being open to the outlets of the upstream fuel passageways 62 and inlets of downstream fuel passageways 78. The downstream fuel passageways 78 extend through the outer part 26 and are positioned around and radially distant from the axis of the outer part. Each downstream fuel passageway 78 includes an inlet at the interior shoulder 76 and an outlet at the lower end of the outer part 26.

Referring to FIGS. 9–10, the porous structure 30 is annular and includes cylindrical and coaxial and outer and inner surfaces 79, 81. The outer and inner surfaces 79, 81 preferably respectively securely engage the interior surface 74 of the outer part 76 and the exterior surface of the stem 60 of the inner part 24 while the cutting tip 20 is assembled as illustrated in FIG. 2, in accordance with the first embodiment of the present invention. The inner surface 81 of the porous structure extends around and defines the bore 72 that receives the stem 60 and is opened at opposite ends of the porous structure 30. The opposite ends of the porous structure 30 respectively securely engage the lower shoulder 64 of the inner part 24 and the interior shoulder 76 of the outer part 26, in accordance with the first embodiment of the present invention. As a result of the porous structure 30 firmly engaging the interior surface 74, stem 60, lower shoulder 64, and interior shoulder 76, gas that flows from the upstream fuel passageways 62 to the downstream fuel passageways 78 is forced to flow through convolute passageways 80 (FIG. 12) the porous structure. Likewise, any flashback attempting to travel from the downstream fuel passageways 78 to the upstream fuel passageways 62 is forced to travel through the multiplicity of convolute passageways 80 of the porous structure 30, which preferably extinguishes the flashback.

Referring to the schematic and enlarged views of FIGS. 11–12, the porous structure 30 includes a multiplicity of pores 82 (only a representative few of which are identified by their reference numeral in FIG. 11), with each defining at least part of a convolute path 80 extending through the porous structure. In accordance with one example of the first embodiment of the present invention, the porous structure 30 is preferably sintered bronze or sintered stainless steel, or the like, with a pore size of about five microns, and preferably there are at least about, and most preferably more than, a hundred of the pores 82/convolute passageways 80 in several square inches of the sintered material. The pore size is an approximate measure of a representative pore 82 in a direction perpendicular to the flow therethrough. In accordance with the first embodiment of the present invention, the preferred pore size and the number of pores may vary widely, depending upon many factors associated with the manufacture and operation of the cutting torch; therefore, pore sizes other than five microns and densities other than a hundred of the pores 82/convolute passageways 80 in several square inches may be used in some applications. Further, and in accordance with an alternative embodiment of the present invention, the porous structure can be any type of material for both allowing the cutting torch to operate in a normal fashion and performing a flashback restricting function. In accordance with this alternative embodiment, the porous structure can be tightly packed steel wool, or the like, or one or more screens that are preferably arranged in layers, or the like.

Referring to FIGS. 1–2, the operation of the cutting torch of the first embodiment of the present invention will be described more specifically. Oxygen and fuel are supplied to the head 22 while the cutting tip 20 is fully mounted thereto, so that oxygen flows through the oxygen passageways 58, and fuel flows through the upstream fuel passageways 62, the porous structure 30, and then the downstream fuel passageways 78. That is, and more generally described, the porous structure 30 is positioned in the fuel passageways of the cutting tip 20. The fuel is discharged from the nozzle 28 and ignited to form a preheat flame that is used to heat a metal workpiece. After the preheat flame has heated the workpiece sufficiently, a high velocity cutting oxygen stream is activated and delivered through the nozzle 28 via the oxygen passageway 58. The high velocity cutting oxygen stream physically removes molten material of the workpiece by oxidation, to cut the workpiece. If during this operation flashback occurs as a result of reverse flow and ignition of the explosive mixture of gases, such as due to an obstruction at the nozzle, the convolute passageways 80 of the porous structure 30 advantageously restrict the flashback from reaching the upstream fuel passageways 62.

When flashback reaches and is extinguished by the porous structure 30, solid byproducts of the flashback, such as carbon, are deposited in the pores 82/convolute passageways 80 of the porous structure. As a result, the porous structure 30 can eventually become clogged so that it is too restrictive to the desired flow of fuel gas therethrough. In this case and in accordance with the first embodiment of the present invention, the used cutting tip 20 is preferably discarded in its entirety and replaced with a new cutting tip. Completely discarding the used cutting tip 20 and replacing it with a new one prevents malfunctioning that could occur if a user incorrectly installs a new porous structure 30 or, even worse, removes and does not replace a clogged porous structure. In this regard, the cutting tip 20 can be generally characterized as a "one-piece" consumable item that is completely discarded if/when it becomes clogged. Alternatively, the porous structure 30 can be readily removable from the cutting tip 20 and is replaceable.

In accordance with another embodiment of the present invention, as an alternative to, or in addition to, the porous structure 30 being positioned in the coaxial annular chamber of the cutting tip 20, as is illustrated in FIGS. 1–2, plug-like pieces of the porous structure can be coaxially positioned within each of the upstream fuel passageways 62 and/or each of the downstream fuel passageways 78, or combinations of these passageways, and these passageways may be enlarged to optimally accommodate the plugs. Similarly, porous structure can be positioned at other locations in the fuel path(s) that are at least partially defined through the cutting tip 20, or the like.

Referring to FIGS. 1–2, an exterior seam 84 is formed where the upper end of the outer part 26 abuts the lower surface of the lower flange 48 of the inner part 24, in accordance with the first embodiment of the present invention. In accordance with another embodiment of the present invention that is partially illustrated in FIG. 13, at least the exterior seam 84 and preferably a substantial portion of the exterior surface of the cutting tip 20 is optionally covered with a coating 86 or otherwise machined in a manner that at least partially fills and/or obscures the exterior seam 84. This advantageously prevents, or at least deters, disassembly of the cutting tip 20, either mechanically by making it more difficult to unscrew the components, or visually by causing an operator to believe that the absence of visible seams indicates that the tip 20 is a unitary part that cannot be disassembled. That is and advantageously, the porous structure 30 is substantially inaccessible within the cutting tip 20, so that it will be understood that the porous structure is not to be replaced. By deterring disassembly, the complete replacement of clogged cutting tips 20 is promoted, which will advantageously avoid malfunctioning that could occur if a user incorrectly installs a new porous structure 30 or, even worse, removes and does not replace a clogged porous structure. Accordingly, the cutting tip 20 is preferably a disposable component. Alternatively, the porous structure can be readily removed from the cutting tip and is replaceable.

An acceptable coating 86 is an anodized coating. A suitable anodized coating can be applied to the cutting tip 20 by a conventional anodic coating process, or the like. Anodic coating includes electrolytically treating the cutting tip 20 so that a film of oxides is formed on its outer surfaces to form the coating 86. Other coating techniques are also within the scope of the present invention, with the resulting coatings preferably being sufficient for deterring disassembly of the cutting tip. Alternatively, the coating 20, or the like, can be formed to obscure the exterior seam 84 by brazing the inner and outer pieces 24, 26 of the cutting tip 20 in the region of the external seam, so that disassembly of the cutting tip is substantially deterred.

FIGS. 14–15 illustrate a cutting tip 90 coaxially mounted to a fitting that is in the form of an adapter 20', in accordance with another embodiment of the present invention. In accordance with this embodiment, the adapter 20' is like the cutting tip 20 of the first embodiment of the present invention, with or without the coating 86 (FIG. 13), except for variations noted and variations that will be apparent to those of ordinary skill in the art. In accordance with this embodiment, the adapter 20' includes exterior threads 92 that mesh with interior threads 94 of the cutting tip 90, so that the cutting tip can be screwed onto the adapter to achieve the configuration illustrated in FIGS. 14–15. The cutting tip 90 includes a hexagonal outer structure 96 for receiving a wrench and facilitating the screwing of the cutting tip 90 onto and off of the adapter 20'.

Referring to FIG. 15, a terminal oxygen passageway 98 extends coaxially through the cutting tip 90, and terminal fuel passageways 100 of the cutting tip are positioned around and radially distant from the axis of the cutting tip. The passageways 98, 100 of the cutting tip 90 will now be described for the configuration in which the cutting tip is fully mounted to the adapter 20', as illustrated in FIGS. 14–15. The inlet of the terminal oxygen passageway 98 is open solely to the outlet of the oxygen passageway 58 of the adapter 20', and the outlet of the oxygen passageway 58 is open solely to the inlet of the terminal oxygen passageway 98. The outlet of the terminal oxygen passageway 98 is open at the lower end (i.e., nozzle) of the cutting tip 90.

The adapter 20' and cutting tip 90 include coaxial annular channels that face and are open to one another to form an annular chamber 102 that encircles and is coaxial with the oxygen passageways 58, 98. The annular chamber 102 is completely closed, except for being open to the outlets of the downstream fuel passageways 78 and inlets of the terminal fuel passageways 100. The outlets of the terminal fuel passageways 100 are at the lower end of the cutting tip 90.

The upper end of the adapter 20' is mounted to the head 22 (FIG. 1) and functions just like the cutting tip 20 of the first embodiment of the present invention, except that the oxygen and fuel are discharged out of the nozzle of the cutting tip 90.

Additionally, if the cutting tip 90 becomes damaged, it can be advantageously replaced with a new one while the adapter 20' remains mounted to the head 22. In this regard, the combination of the adapter 20' and the cutting tip 90 can be generally characterized as a "two-piece" item, with the tip 90 being the consumable item. Conversely, if it is necessary to change the adapter 20' because of debris from previous flashbacks, the cutting tip 90 currently being used can be removed from the old adapter and placed on the new adapter, to avoid discarding a usable cutting tip.

Referring to FIG. 16, a fitting in the form of an adapter 110 is shown exploded away from a head 22' of an oxy-fuel cutting torch, in accordance with another embodiment of the present invention. The cutting torch of this embodiment of the present invention is identical to the cutting torch of the first embodiment of the present invention, except for variations noted and variations that will be apparent to those of ordinary skill in the art. For example, the head 22' illustrated in FIG. 16 is identical to the head 22 of the first embodiment illustrated in FIG. 1, except that the composite cavity 34' in the head 22' is shaped differently below the upper seat 36. More specifically, the interior surface of the head 22' includes annular middle and lower seating surfaces (i.e., middle and lower seats 112, 114) that extend around, are coaxial with, and perpendicular with respect to the axis of the composite cavity 34'.

The adapter 110 includes a body 116 and a porous structure 30' that are coaxially positioned with respect to one another, and in some examples of the present invention they are mounted to one another via one or more means, as will be discussed in greater detail below. Except for having different overall dimensions, the porous structure 30' of the present embodiment is identical to the porous structure 30 of the first embodiment of the present invention. The body 116 includes an interior surface that extends coaxially around the axis of the body to define a bore 118 that is open at the upper and lower ends of the body. The interior surface of the body 116 includes a cylindrical interior surface 120, an annular interior shoulder 122, an annular seating surface (i.e., interior seat 124), and interior threads 126, all of which coaxially extend around the axis of the body. Additionally, the interior seat 124 defines an oblique angle with respect to the axis of the body 116.

In accordance with some examples of this embodiment, the porous structure 30' is preferably substantially permanently installed to the body 116, such as by at least one of several mounting techniques. In contrast, and in accordance with other examples of this embodiment, the porous structure 30' is associated with the body 116 such that the porous structure can be readily removed from the body and replaced. In accordance with the illustrated example of this embodiment, two mounting techniques are used, namely a press-fit and an attachment device are used to install the porous structure to the body 116, although the press-fit alone is preferred in another example. Regarding the press-fit, the interior surface 120 of the body 116 and the outer surface of the porous structure 30' are sized so that when the porous structure is forced into the upper end of the bore 118, the frictional interaction between the outer surface of the porous structure and the interior surface 120 holds the porous structure in the configuration illustrated in FIG. 16. In this configuration, the lower end the porous structure 30' securely engages the interior shoulder 122 of the body.

One or more fasteners in the form of retaining pins 128, or the like, may extend through a portion of the body 116 and into the porous structure 30', as illustrated for one pin 128 in FIG. 16. In accordance with an alternative embodiment of the present invention, retaining pins 128 for mounting the porous structure 30' to the body 116 are not included in the adapter 110. Alternatively, the one or more retaining pins 128 can be replaced with other fastening devices, such as retaining rings or any other fastening means.

One or more ports 130, each having an axis that extends radially with respect to the axis of the body 116, extend through the body and have an inlet at a cylindrical outer surface 132 of the body 116 and an outlet at the interior surface 120 of the body. The cylindrical surface 120 further defines an annular groove 134 that is coaxial with the body 116 and encircles, or at least partially encircles, the axis of the body. The outlet of each port 130 and convolute passageways 80 (FIG. 12) of the porous structure 30' are open to the groove 134. In some alternative embodiments of the present invention the groove 134 is omitted or alternatively formed in the outer surface of the porous structure 30', and likewise all but one of the ports 130 can be omitted in some circumstances.

The upper end of the body 116 is inserted into the composite cavity 34' of the head 22', and then the body is rotated so that its exterior threads 136, which are coaxial with the body, mesh with the internal threads 40' of the head. The bottom surface of the body 116 includes two receptacles 138 for receiving the tips of a forked tool that can be used to rotate the adapter 110, so that it is screwed into the head 22'. Means other than the receptacles 138 can be used to facilitate the screwing and unscrewing. Additionally and accordance with alternative embodiments of the present invention, the threads 136 and 40' can be replaced with other means for facilitating the attachment, and preferably also the unattachment, between the body 116 and the head 22'. For example, different types of threads can be used; various "snap-fits" or press-fits can be used; a lateral retaining screw or pin, or the like, can extend radially through the head 22' and engage the body 116; and any other connecting means can be used.

The upper surfaces of the body 116 and porous structure 30' sealingly engage the middle seat 112 of the head 22' while the adapter 110 is fully mounted to the head. Likewise, an annular exterior seat 140 of the body, which is coaxial with and encircles the axis of the body, sealingly engages the lower seat 114 of the head while the adapter 110 is fully mounted to the head. The outer surface 132 of the body 116 defines a smaller diameter than a cylindrical inner surface 142 of the head 22'. The inner surface 142 encircles the outer surface 132 while the adapter 110 is fully mounted to the head 22', so that these surfaces do not contact one another and a plenum-like, annular outer chamber, channel or space is defined between these surfaces while the adapter is fully mounted to the head. It is advantageous for the outer chamber between the surfaces 132, 142 to be formed so that it can function as a fuel passageway, so that the port 130 of the adapter 110 need not align with the fuel port 44 in the head 22'. Alternatively, the port 130 substantially coaxially aligns with the fuel port 44.

A conventional cutting tip or a cutting tip 20 as described above, or the like, is mounted to the adapter 110 while the adapter is fully mounted to the head 22'. For example, the cutting tip 20 is mounted to the adapter 110 by inserting the upper end of the cutting tip into the bore 118 of the adapter and then engaging the threads 46 of the nut 32 (FIG. 1) to the interior threads 126 of the adapter. The nut 32 is rotated so that an annular upper edge of the nut engages the lower surface of the lower flange 48 of the cutting tip 20 to force the cutting tip into the both the bore 118 of the adapter and the composite cavity 34' of the head 22'. Movement of the cutting tip 20 into the bore 118 and composite cavity 34' ceases when the cutting tip, adapter 110 and head 22' are coaxial and the cutting tip fully engages the respective seats of the body and head. More specifically, the upper and lower seats 50, 52 of the cutting tip 20 respectively coaxially and securely engage the upper seat 36 of the head 22' and the interior seat 124 of the adapter.

An oxygen chamber is formed within the upper region of the composite cavity 34' while the upper seats 50, 36 are securely engaged to one another. The oxygen chamber is open to the oxygen port 42 and closed to the fuel port 44, and the upper flange 54 of the cutting tip 20 is positioned within the oxygen chamber. At the same time, the lower seat 52 of the cutting tip 20 and the interior seat 124 of the adapter 110, and the exterior seat 140 of the adapter and the lower seat 114 of the head 22', are securely engaged to one another so that a fuel chamber is formed within the composite cavity '34. The fuel chamber is open to the fuel port 44 and closed to the oxygen port 42.

While the adapter 110 is installed to the head 22' and the cutting tip 20 is installed to the adapter as described above, the upper stem 144 of the cutting tip extends through the bore 72' of the porous structure 30'. The inner surface 81' of the porous structure 30' defines a larger diameter than the outer surface of the upper stem 144 so that a plenum-like, annular inner chamber is defined between the upper stem and the inner surface of the porous structure, and the inlets of the upstream fuel passageways 62 of the cutting tip 20 are contiguous with and open to this chamber. More specifically, and in accordance with the embodiment illustrated in FIG. 16, the inner surface 81' of the porous structure 30' is in opposing face-to-face relation with the outer surface of the upper stem 144 of the cutting tip 20 while the adapter 110 is installed to the head 22' and the cutting tip 20 is installed to the adapter. In accordance with a similar alternative embodiment of the present invention that is not illustrated in the drawings, the porous structure 30' is positioned in a recess, or the like, defined in the adapter 110, so that the upper stem 144 of the cutting tip extends through the bore 72' of the porous structure 30', but the inner surface 81' of the porous structure 30' is not in opposing face-to-face relation with the outer surface of the upper stem 144 while the adapter 110 is installed to the head 22' and the cutting tip 20 is installed to the adapter.

Oxygen and fuel are supplied to the head 22' while the adapter 110 and cutting tip 20 are fully mounted thereto as described above. As a result, oxygen flows through the oxygen passageway 58 of the cutting tip. The fuel flows from the annular outer chamber defined between the outer surface 132 of the adapter 110 and the inner surface 142 of the head 22' to the annular inner chamber defined between the inner surface 81' of the porous structure 30' and the outer surface of the upper stem 144. The flow between these chambers is via the port 130, groove 134 and convolute passageways 80 of the adapter 110. Then the fuel flows from the inner annular chamber, which is defined between the inner surface 81' of the porous structure 30' and the outer surface of the upper stem 144, into the upstream fuel passageways 62 of the cutting tip 20. Thereafter, the oxygen and fuel are discharged from the nozzle 28 of the cutting tip 20 as described above. If during operation flashback occurs as a result of reverse flow and ignition of the explosive mixture of gases, such as due to an obstruction at the nozzle 28, the porous structure 30' advantageously restricts the flashback from reaching the one or more radial ports 130 of the adapter 110.

When flashback reaches and is extinguished by the porous structure 30', solid byproducts of the flashback, such as carbon, are deposited in the porous structure. As a result, the porous structure 30' can eventually become clogged so that it is too restrictive to the desired flow of fuel gas therethrough. In this case, the used adapter 110 is preferably discarded in its entirety and replaced with a new adapter. Completely discarding the used adapter 110 and replacing it with a new one will advantageously prevent malfunctioning that could occur if a user incorrectly installed a new porous structure 30' or, even worse, removes and does not replace a clogged porous structure. Removing the porous structure 30' from an adapter 110 and installing a new porous structure to the same adapter is advantageously discouraged by the secure mounting of the porous structure to the body 116 of the adapter. Alternatively, the porous structure 30' can be connected to or otherwise associated with the adapter 110 such that the porous structure can be readily removed from the adapter and replaced.

Those of ordinary skill in the art understand that oxy-fuel torches include both "post-mixed" and "premixed" cutting torches, and that the present invention has been described in the context of premixed cutting torches. That is, in accordance with illustrated embodiments of the present invention, the fuel supplied via the fuel ports 44 is a mixture of oxygen and a fuel gas, such as acetylene, or the like. Although the present invention has been described above in the context of "premixed" torches, the present invention is also applicable to "post-mixed" cutting torches.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cutting torch capable of restricting flashback, comprising:

a head including an interior surface extending around and defining a head cavity, an oxygen port that is open to the head cavity and is for receiving oxygen from an oxygen supply and supplying oxygen to the head cavity, and a fuel port that is open to the head cavity and is for receiving fuel from a fuel supply and supplying fuel to the head cavity; and a fitting having a body for being mounted to and unmounted from the head, wherein an end of the body is inserted into the head cavity when mounting the body to the head, the end of the body is withdrawn from the head cavity when unmounting the body from the head, the body defines at least one oxygen passageway that is in communication with the oxygen port for receiving oxygen from the oxygen port while the body is mounted to the head, the fitting defines at least one fuel passageway that is in communication with the fuel port for receiving fuel from the fuel port while the body is mounted to the head, the fitting further includes a porous structure that is a distinct component from the body and has a multiplicity of convolute passageways extending therethrough, with the body including parts connected together so that:

the porous structure is fitted relative to the body so that the porous structure restricts flashback from entering the fuel port of the head while the body is mounted to the head, and the porous structure is integrated with the fitting such that the porous structure moves with the body when the body is moved from being completely separate from the head to being mounted to the head and when the body is being moved from being mounted to the head to being completely separate from the head, wherein a first part of the parts of the body and a second part of the parts of the body are arranged so that surfaces of the first and second parts together define a chamber containing the porous structure, the first part of the body includes upstream portions of the fuel passageway, and the second part of the body includes downstream portions of the fuel passageway.

2. A cutting torch according to claim 1, wherein the end of the fitting that is inserted into the head cavity is a first end, the fitting is a cutting tip having a second end that is opposite from the first end, and the second end is for discharging the fuel to create a flame for heating a workpiece and for discharging the oxygen to oxidize and thereby cut the heated workpiece.

3. A fitting according to claim 2, wherein the parts connected together comprises the parts having threads by which the parts are screwed together.

4. A cutting torch according to claim 1, wherein the fitting is an adapter, and wherein the cutting torch further comprises a cutting tip having a first end mounted to the adapter for receiving oxygen and fuel from the adapter, and a second end for discharging the fuel to create a flame for heating a workpiece and for discharging oxygen to oxidize and thereby cut the heated workpiece.

5. A fitting according to claim 4, wherein the parts connected together comprises the parts having threads by which the parts are screwed together.

6. A cutting torch according to claim 1, wherein the end is a first end of the body, the body has a second end opposite from the first end, the oxygen passageway extends from the first end to the second end, and a plurality of fuel passageways extend from proximate the first end to the second end and are positioned around and radially distant from the oxygen passageway.

7. A fitting according to claim 6, wherein the parts connected together comprises the parts having threads by which the parts are screwed together.

8. A cutting torch according to claim 1, wherein the chamber containing the porous structure is a first annular chamber, the body defines a second annular chamber, and the annular chambers are axially distant from one another.

9. A fitting according to claim 8, wherein the parts connected together comprises the parts having threads by which the parts are screwed together.

10. A fitting according to claim 1, wherein the parts connected together comprises the parts having threads by which the parts are screwed together.

11. A cutting torch capable of restricting flashback, comprising:

a head including an interior surface extending around and defining a head cavity, an oxygen port that is open to the head cavity and is for receiving oxygen from an oxygen supply and supplying oxygen to the head cavity, and a fuel port that is open to the head cavity and is for receiving fuel from a fuel supply and supplying fuel to the head cavity; and a fitting having a body for being mounted to and unmounted from the head, wherein an end of the body is inserted into the head cavity when mounting the body to the head, the end of the body is withdrawn from the head cavity when unmounting the body from the head, the body defines at least one oxygen passageway that is in communication with the oxygen port for receiving oxygen from the oxygen port while the body is mounted to the head, the fitting defines at least one fuel passageway that is in communication with the fuel port for receiving fuel from the fuel port while the body is mounted to the head, the fitting further includes a porous structure that is a distinct component from the body and has a multiplicity of convolute passageways extending therethrough, with the body including parts connected together so that:

the porous structure is fitted relative to the body so that the porous structure restricts flashback from entering the fuel port of the head while the body is mounted to the head, and the porous structure is integrated with the fitting such that the porous structure moves with the body when the body is moved from being completely separate from the head to being mounted to the head and when the body is being moved from being mounted to the head to being completely separate from the head, wherein a first part of the parts of the body and a second part of the parts of the body are arranged so that surfaces of the first and second parts together define a chamber containing the porous structure, and so that an external seam is at least initially defined between the first and second parts.

12. A cutting torch according to claim 11, wherein the fitting further includes an external coating that at least partially fills the seam and thereby at least partially hides the seam from view.

13. A fitting according to claim 12, wherein the parts connected together comprises the parts having threads by which the parts are screwed together.

14. A fitting according to claim 11, wherein the parts connected together comprises the parts having threads by which the parts are screwed together.

15. A cutting torch capable of restricting flashback, comprising:
   a head including an interior surface extending around and defining a head cavity, an oxygen port that is open to the head cavity and is for receiving oxygen from an oxygen supply and supplying oxygen to the head cavity, and a fuel port that is open to the head cavity and is for receiving fuel from a fuel supply and supplying fuel to the head cavity; and
   a fitting having a body for being mounted to and unmounted from the head, wherein an end of the body is inserted into the head cavity when mounting the body to the head, the end of the body is withdrawn from the head cavity when unmounting the body from the head, the body defines at least one oxygen passageway that is in communication with the oxygen port for receiving oxygen from the oxygen port while the body is mounted to the head, the fitting defines at least one fuel passageway that is in communication with the fuel port for receiving fuel from the fuel port while the body is mounted to the head, the fitting further includes a porous structure that is a distinct component from the body and has a multiplicity of convolute passageways extending therethrough, with the body including parts connected together so that:
      the porous structure is fitted relative to the body so that the porous structure restricts flashback from entering the fuel port of the head while the body is mounted to the head, and
      the porous structure is integrated with the fitting such that the porous structure moves with the body when the body is moved from being completely separate from the head to being mounted to the head and when the body is being moved from being mounted to the head to being completely separate from the head,
   wherein the end is a first end of the body, the body has a second end opposite from the first end, the oxygen passageway extends from the first end to the second end, and a plurality of fuel passageways extend from proximate the first end to the second end and are positioned around and radially distant from the oxygen passageway, and
   wherein the body defines an annular chamber that extends around and is isolated from the oxygen passageway, each of the fuel passageways has an upstream portion and a downstream portion, for each fuel passageway the upstream portion has an outlet that is open to the annular chamber and the downstream portion has an inlet that is open to the annular chamber, and the porous structure is postioned in the annular chamber.

16. A cutting torch according to claim 15, wherein a first part of the parts of the body is mounted to a second part of the parts of the body and surfaces of the first and second parts together define the chamber containing the porous structure, the first part of the body includes the upstream portions of the fuel passageway, and the second part of the body includes the downstream portions of the fuel passageway.

17. A cutting torch according to claim 16, wherein the second part of the body includes a bore, the first part of the body includes the oxygen passageway, and the oxygen passageway extends through the bore.

18. A fitting according to claim 17, wherein the parts connected together comprises the parts having threads by which the parts are screwed together.

19. A fitting according to claim 16, wherein the parts connected together comprises the parts having threads by which the parts are screwed together.

20. A cutting torch according to claim 15, wherein the annular chamber is a first annular chamber, the body defines a second annular chamber that is distant from the first annular chamber and extends around and is isolated from the oxygen passageway, and the downstream portion of each fuel passageway is open to the second annular chamber.

21. A fitting according to claim 20, wherein the parts connected together comprises the parts having threads by which the parts are screwed together.

22. A fitting according to claim 15, wherein the parts connected together comprises the parts having threads by which the parts are screwed together.

23. A fitting for being mounted to a head of a cutting torch for receiving oxygen and fuel from the head and restricting flashback, the fitting comprising:
   at least one oxygen passageway having an inlet at a first end of the fitting for receiving oxygen from the head and an outlet at a second end of the fitting for discharging the oxygen from the fitting;
   an annular chamber that extends around and is isolated from the oxygen passageway, wherein the annular chamber is positioned between the first and second ends;
   at least one upstream fuel passageway positioned radially distant from the oxygen passageway, and having an inlet positioned between the first and second ends for receiving fuel from the head and an outlet that is open to the chamber for discharging the fuel into the chamber;
   at least one downstream fuel passageway positioned radially distant from the oxygen passageway, and having an inlet that is open to the chamber for receiving fuel from the chamber and an outlet at the second end for discharging the fuel from the fitting; and
   porous structure having a multiplicity of convolute passageways extending therethrough,
   wherein the fitting includes parts connected together so that the porous structure is positioned in the chamber to restrict flashback from passing through the chamber.

24. A fitting according to claim 23, wherein the annular chamber is a first annular chamber, the fitting defines a second annular chamber that is distant from the first annular chamber and extends around and is isolated from the oxygen passageway, the downstream fuel passageway has an upstream portion and a downstream portion, the upstream portion has an outlet that is open to the second annular chamber, and the downstream portion has an inlet that is open to the first annular chamber.

25. A fitting according to claim 24, wherein the parts connected together comprises the parts having threads by which the parts are screwed together.

26. A fitting according to claim 24, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

27. A fitting according to claim 26, wherein the parts connected together comprises the parts having threads by which the parts are screwed together.

28. A fitting according to claim 23, wherein a first part of the parts is mounted to a second part of the parts so that surfaces of the first and second parts together define the chamber and so that an external seam is at least initially defined between the first and second parts.

29. A fitting according to claim 28, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

30. A fitting according to claim 29, wherein the parts connected together comprises the parts having threads by which the parts are screwed together.

31. A fitting according to claim 28, wherein the fitting further includes an external coating that at least partially fills the seam and thereby at least partially hides the seam from view.

32. A fitting according to claim 31, wherein the parts connected together comprises the parts having threads by which the parts are screwed together.

33. A fitting according to claim 31, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

34. A fitting according to claim 33, wherein the parts connected together comprises the parts having threads by which the parts are screwed together.

35. A fitting according to claim 28, wherein the parts connected together comprises the parts having threads by which the parts are screwed together.

36. A fitting according to claim 23, wherein a first part of the parts is mounted to a second part of the parts, the first part includes the upstream fuel passageway, and the second part includes the downstream fuel passageway.

37. A fitting according to claim 36, wherein the second part includes a bore, the first part includes the oxygen passageway, and the oxygen passageway extends through the bore.

38. A fitting according to claim 37, wherein the parts connected together comprises the parts having threads by which the parts are screwed together.

39. A fitting according to claim 37, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

40. A fitting according to claim 39, wherein the parts connected together comprises the parts having threads by which the parts are screwed together.

41. A fitting according to claim 36, wherein the parts connected together comprises the parts having threads by which the parts are screwed together.

42. A fitting according to claim 36, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

43. A fitting according to claim 42, wherein the parts connected together comprises the parts having threads by which the parts are screwed together.

44. A fitting according to claim 27, wherein the annular chamber is a first annular chamber, and the fitting defines a second annular chamber that is axially distant from the first annular chamber.

45. A fitting according to claim 23, wherein the parts connected together comprises the parts having threads by which the parts are screwed together.

46. A fitting according to claim 44, wherein the parts connected together comprises the parts having threads by which the parts are screwed together.

47. A fitting according to claim 46, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

48. A fitting according to claim 23, wherein:
the upstream fuel passageway is one of a plurality of upstream fuel passageways, with each of the plurality of upstream fuel passageways being positioned radially distant from and around the oxygen passageway; and
the downstream fuel passageway is one of a plurality of downstream fuel passageways, with the plurality of downstream fuel passageways being positioned radially distant from around the oxygen passageway.

49. A fitting according to claim 48, wherein the parts connected together comprises the parts having threads by which the parts are screwed together.

* * * * *